(12) United States Patent
Manes et al.

(10) Patent No.: US 10,927,915 B2
(45) Date of Patent: Feb. 23, 2021

(54) SPRING USEFUL FOR ELEVATOR SAFETY DEVICE

(71) Applicant: OTIS ELEVATOR COMPANY, Farmington, CT (US)

(72) Inventors: Enrico Manes, Feeding Hills, MA (US); Robert A. Barth, South Windsor, CT (US); Xiaodong Luo, South Windsor, CT (US); Shihemn Chen, Bolton, CT (US); Daryl J. Marvin, Farmington, CT (US); Michael A. Klecka, Coventry, CT (US); Luke A. Mishler, Manchester, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 399 days.

(21) Appl. No.: 15/843,781

(22) Filed: Dec. 15, 2017

(65) Prior Publication Data
US 2019/0186573 A1    Jun. 20, 2019

(51) Int. Cl.
*F16F 1/18*     (2006.01)
*B33Y 80/00*    (2015.01)
*B66B 5/22*     (2006.01)

(52) U.S. Cl.
CPC .............. *F16F 1/187* (2013.01); *B33Y 80/00* (2014.12); *B66B 5/22* (2013.01); *F16F 2224/0208* (2013.01); *F16F 2226/04* (2013.01); *F16F 2234/00* (2013.01)

(58) Field of Classification Search
CPC ............. F16F 1/187; B33Y 80/00; B66B 5/22
See application file for complete search history.

(56) References Cited

U.S. PATENT DOCUMENTS

| | | | | |
|---|---|---|---|---|
| 2,874,458 A | * | 2/1959 | Smith | B29D 22/023 29/436 |
| 3,083,065 A | * | 3/1963 | Hinks | F16C 33/24 384/221 |
| 4,625,526 A | * | 12/1986 | Milawski | A44C 15/0095 24/523 |
| 5,782,319 A | * | 7/1998 | Woodruff | B66B 5/22 187/376 |
| 6,026,936 A | * | 2/2000 | Aulanko | B66B 5/18 187/376 |
| 6,077,301 A | * | 6/2000 | Pusch | A61F 2/66 623/53 |
| 6,109,398 A | * | 8/2000 | Lempio | B66B 5/18 188/82.4 |

(Continued)

FOREIGN PATENT DOCUMENTS

CN     103693524 A    4/2014
CN     203570892 U    4/2014

(Continued)

OTHER PUBLICATIONS

Extended European Search Report for Application No. EP 18 21 2846 dated Jun. 7, 2019.

*Primary Examiner* — Michael A Riegelman
(74) *Attorney, Agent, or Firm* — Carlson, Gaskey & Olds

(57) ABSTRACT

An illustrative example spring includes a curved shape body having a length. The body includes a cavity that extends along at least a majority of the length. The body has a cross-section across the length that is different at a plurality of locations on the body along the length.

13 Claims, 3 Drawing Sheets

(56) References Cited

U.S. PATENT DOCUMENTS

| | | | |
|---|---|---|---|
| 6,823,969 B2 | 11/2004 | Simmonds et al. | |
| 7,886,406 B2* | 2/2011 | Chang | E05D 5/08 16/252 |
| 2003/0085085 A1* | 5/2003 | Simmonds | B66B 5/22 188/189 |
| 2012/0248285 A1* | 10/2012 | Mitsch | F16F 1/3863 248/636 |
| 2013/0023347 A1* | 1/2013 | Okada | F16F 15/123 464/68.1 |
| 2014/0243998 A1* | 8/2014 | Phillips | A61F 2/66 623/55 |
| 2016/0000391 A1* | 1/2016 | Galloni | A61B 6/4452 378/189 |
| 2017/0261058 A1* | 9/2017 | Chen | B33Y 10/00 |
| 2019/0186573 A1* | 6/2019 | Manes | B33Y 80/00 |

FOREIGN PATENT DOCUMENTS

| | | |
|---|---|---|
| CN | 104276478 A | 1/2015 |
| CN | 104493445 A | 4/2015 |
| CN | 104692213 A | 6/2015 |
| CN | 106185528 A | 12/2016 |
| DE | 7720627 U1 | 10/1977 |
| JP | H04337128 A | 11/1992 |
| JP | H10252793 A | 9/1998 |
| JP | 11011818 | 1/1999 |
| JP | 2000302351 A | 10/2000 |
| JP | 203962809 U | 11/2014 |

* cited by examiner

SPRING USEFUL FOR ELEVATOR SAFETY DEVICE

BACKGROUND

Elevator systems include a variety of devices for controlling movement of the elevator car. Elevator safeties are braking devices that address overspeed conditions where an elevator car is moving faster than a desired speed. Some elevator safeties include a spring to achieve a desired braking force. Such springs typically have a substantially rectangular cross-section and are heated and bent to a desired orientation.

While such springs have proven useful, they are not without drawbacks. For example, achieving a larger force with such springs typically requires an increase in thickness of the spring material. Thicker material introduces additional material cost and manufacturing difficulty. Larger springs are more difficult to bend, for example. The necessary tooling and processing to meet strength and stiffness requirements is very expensive. Additionally, a variety of spring sizes are required for different elevator safety configurations or different performance parameters, which further increases the number of tools, manufacturing steps, and expense.

There is a need for an improved elevator safety spring design.

SUMMARY

An illustrative example spring includes a curved shape body having a length. The body includes a cavity that extends along at least a majority of the length. The body has a cross-section across the length that is different at a plurality of locations on the body along the length.

In an example embodiment having one or more features of the spring of the previous paragraph, the cavity extends along an entirety of the length.

In an example embodiment having one or more features of the spring of any of the previous paragraphs, the cavity has a different dimension at the plurality of locations.

In an example embodiment having one or more features of the spring of any of the previous paragraphs, the spring exerts a spring force and a ratio of a moment of inertia of the spring to the spring force is essentially constant along the length.

In an example embodiment having one or more features of the spring of any of the previous paragraphs, the curved shaped body has a C-shape including two ends, the body has a height in a direction transverse to the length, and the height has a maximum near a center of the C-shape between the two ends.

In an example embodiment having one or more features of the spring of any of the previous paragraphs, the body comprises outer surfaces oriented transverse to the length and a plurality of webs between the outer surfaces. The cavity is at least partially defined between the outer surfaces and the webs.

In an example embodiment having one or more features of the spring of any of the previous paragraphs, the outer surfaces and the webs form two I-beams joined side-by-side.

In an example embodiment having one or more features of the spring of any of the previous paragraphs, the body comprises high strength steel.

In an example embodiment having one or more features of the spring of any of the previous paragraphs, the body is formed by at least one of casting and three-dimensional printing.

In an example embodiment having one or more features of the spring of any of the previous paragraphs, the curved shaped body has a C-shape and the spring exerts a spring force toward an inside of the C-shape.

In an example embodiment having one or more features of the spring of any of the previous paragraphs, the cavity has a different dimension at the plurality of locations.

An illustrative example elevator safety device includes the spring of any of the previous paragraphs and at least one brake member that is configured to engage a surface in a hoistway for stopping an elevator car. The spring urges the at least one brake member in a direction to engage the surface.

In an example embodiment having one or more features of the elevator safety device of the previous paragraph, the body has a C-shape including two ends and an inside of the ends are situated to urge a respective brake member toward an inside of the C-shape.

In an example embodiment having one or more features of the elevator safety device of any of the previous paragraphs, the safety device comprises a brake housing, the respective brake members are supported on the brake housing for movement in a first direction between a disengaged position and a braking position, and the spring urges the brake members in a second direction that is transverse to the first direction.

In an example embodiment having one or more features of the elevator safety device of any of the previous paragraphs, the body flexes outwardly responsive to the brake members moving into the braking position while urging the brake members toward the inside of the C-shape.

An illustrative example method of making a spring includes forming a spring body including a curved shape, a length, a cavity that extends along at least a majority of the length, and a cross-section across the length. The cross-section is different at a plurality of locations on the body along the length.

In an example embodiment having one or more features of the method of previous paragraph, the forming comprises at least one of casting and three-dimensional printing.

In an example embodiment having one or more features of the method of any of the previous paragraphs, the casting comprises sandcasting.

An example embodiment having one or more features of the method of any of the previous paragraphs, includes forming the spring body of high strength steel.

In an example embodiment having one or more features of the method of any of the previous paragraphs, the cavity has a different dimension at the plurality of locations.

The various features and advantages of at least one disclosed example embodiment will become apparent to those skilled in the art from the following detailed description. The drawings that accompany the detailed description can be briefly described as follows.

DETAILED DESCRIPTION

Springs designed according to an embodiment of this invention are useful, for example, in elevator safety devices for urging brake members against a surface to apply a braking force to control movement of an elevator car. Springs designed according to an embodiment of this invention have a unique body configuration that reduces weight, reduces material cost, and reduces manufacturing complexity compared to previous spring configurations. At the same time, springs designed according to an embodiment of this invention provide a desired spring performance.

Figure 1:
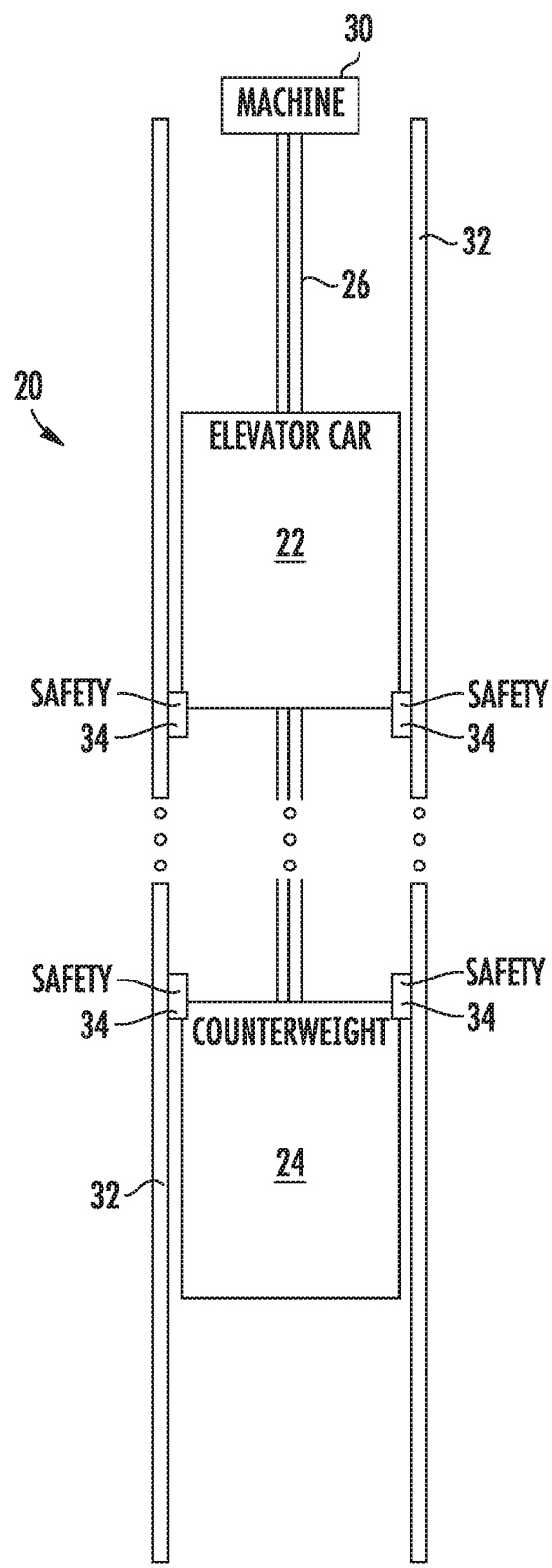
FIG. 1 schematically illustrates selected portions of an elevator system including safety devices designed according to an embodiment of this invention.

FIG. 1 schematically illustrates selected portions of an elevator system 20, which is an example environment in which a spring designed according to an embodiment of this invention is useful. The elevator system 20 includes an elevator car 22 and counterweight 24 suspended by a roping arrangement 26. A machine 30 causes movement of the roping arrangement 26 to cause desired movement of the elevator car along guiderails 32. In this example, the elevator car 22 and the counterweight 24 have safeties 34 that are capable of applying a braking force to a surface of the guiderails 32 for stopping the elevator car 22 as may be desired.

Figure 2:
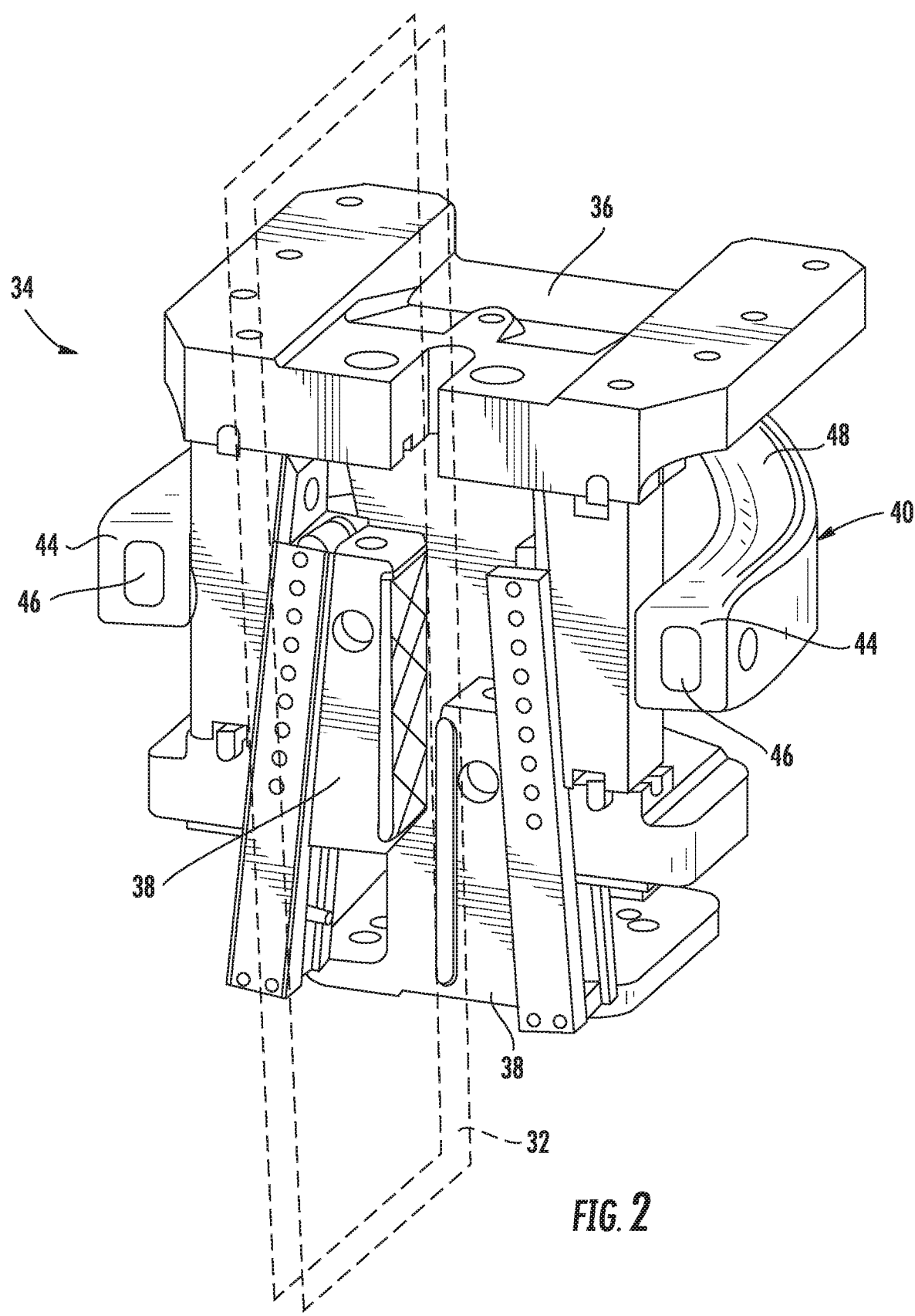
FIG. 2 diagrammatically illustrates an example elevator safety device designed according to an embodiment of this invention.

FIG. 2 illustrates an example configuration of a safety 34. A housing 36 supports brake members 38 that are configured to engage a guiderail 32 to apply a braking force for stopping movement of the elevator car 22, for example. One of the brake members 38 (to the right in the drawing) is shown in a disengaged or rest position. The other brake member 38 (to the left according to the drawing) is shown in a braking position. The brake members 38 are moveable between the disengaged and braking position by moving relative to the housing in a vertical direction.

The safety 34 includes a spring 40 that urges the brake members 38 toward engagement with a surface of the guiderail 32 when a braking force is needed. The force of the spring 40 urges the brake members 38 in a direction that is transverse to the direction of movement of the brake members 38 between the disengaged and braking positions (e.g., the spring force is horizontal according to the drawing).

Figure 3:
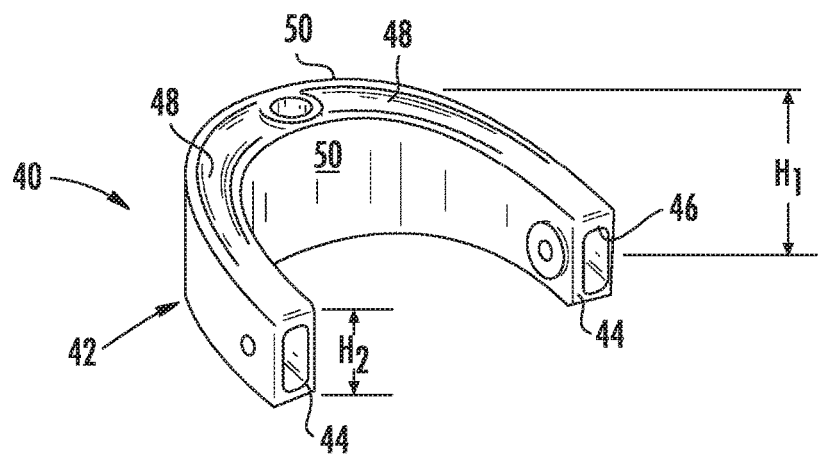
FIG. 3 is a perspective illustration of an example spring designed according to an embodiment of this invention.
Figure 4:
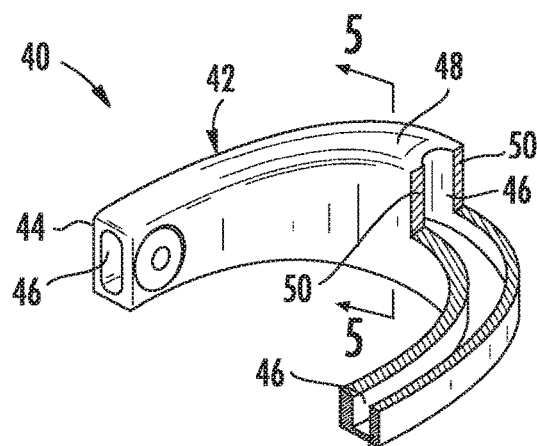
FIG. 4 is a perspective, partially cut away illustration of the spring shown in FIG. 3.
Figure 5:
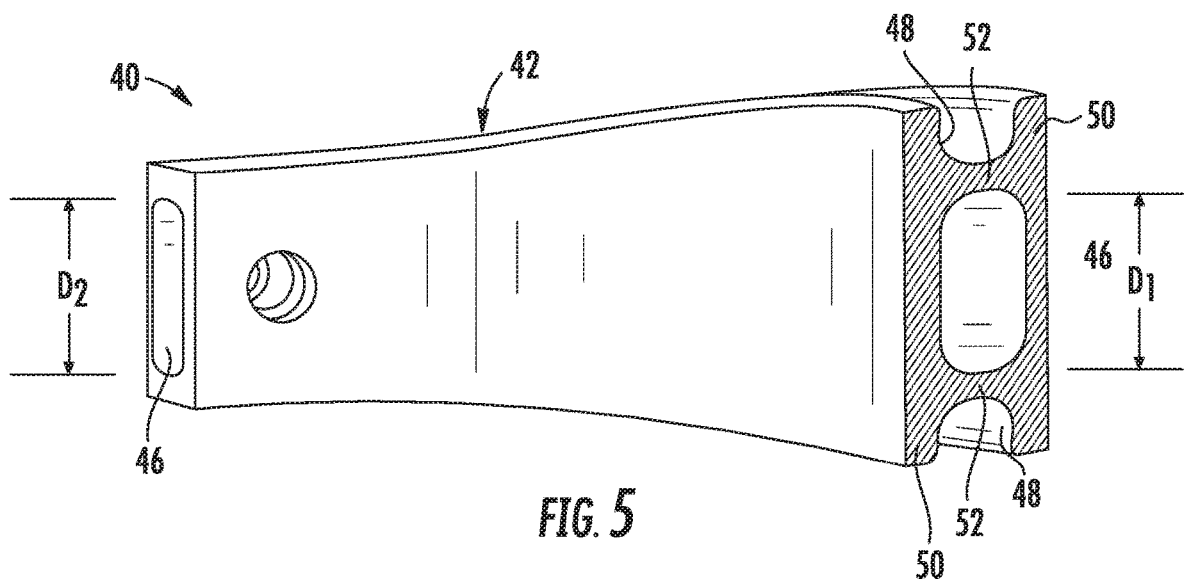
FIG. 5 is a cross-sectional illustration taken along the lines 5-5 in FIG. 4.

As best appreciated from FIGS. 3-5, the spring 40 includes a curved shape body 42 that has a length between two ends 44. The body 42 includes a cavity 46 that extends along at least a majority of the length of the body. In the illustrated example, the cavity 46 extends along an entirety of the length.

The body 42 includes exterior grooves 48 between exterior surfaces 50. A plurality of webs 52 extend between the exterior surfaces 50. The cavity 46 is at least partially defined between the exterior surfaces 50 and the webs 52 as can be appreciated in FIG. 5, for example. In the illustrated example, the outer surfaces 50 and the webs 52 form two I-beams joined side-by-side.

One of the features of the spring 40 is that the body has different cross-sectional dimensions at different locations along the length of the body 42. For example, the body 42 has a height that is transverse to the length. The height has a maximum H1 near a center of the body 42 between the two ends 44. The height is at a minimum H2 at the ends 44 in this example. Varying the cross-section along the length of the body 42 facilitates having essentially uniform deflection along the length of the spring 40 in use. In the illustrated example, a ratio of the moment of inertia to the spring force applied by the spring is essentially constant along the length of the spring 40. In other words, the ratio of the moment of inertia to the applied spring force is kept constant at all locations along the length of the spring 40.

One aspect of having a cavity 46 within the body 42 is that the thickness of the material of the solid portions of the body 42 can be kept more uniform along the length of the spring 40 while still having different cross-sectional dimensions of the body at different locations along the length. Having a more uniform material thickness facilitates heat treating the body 42 for forming the curved shape, which is C-shaped in the illustrated example. If the cavity 46 were not present, portions of the spring body 42 would be thicker than others and that would complicate the heat treating process making it more difficult to achieve a spring having the desired force and deflection characteristics.

The cavity 46 in the illustrated example has different dimensions at different locations along the length of the body 42. For example, a first dimension D1 closer to a center of the body 42 lengthwise is different than a second dimension D2 near an end 44. The dimension or cross-section of the cavity 46 may vary at different locations along the length in height, width, shape or a combination of those.

An example embodiment includes forming the spring 40 by casting a high strength steel material such as commercially available 1020 steels or 4130 alloy materials. Some embodiments include advanced high strength steel. Other embodiments include ultra high strength steel.

The process of forming the body 42 in some examples includes sand casting a high strength steel material to form the body including the cavity 46.

Some embodiments include forming the body 42 by utilizing three-dimensional printing. For example, portions of the body may be cast and then three-dimensional printing is used to form specific features on the body 42 that may be difficult to cast. Other embodiments include utilizing three-dimensional printing for forming the entire body 42.

Although casting typically results in a product having porosity that tends to introduce stress points in a spring more so than a forging process, utilizing high strength steel and forming the body to have features including the cavity 46 allows for realizing a spring 40 that is capable of applying a relatively large spring force and undergoing relatively large displacement without experiencing the stress that otherwise would be introduced by the porosity associated with some casting processes.

Springs designed according to an embodiment of this invention can be lighter weight, less costly in terms of materials and manufactured in a less complex way than previous spring designs.

While various features are included in the illustrated example embodiment, those skilled in the art will realize that not all of those features are required for all embodiments of this invention. For example, one embodiment may have a varying cross-section of the body 42 with a cavity 46 whose cross-section does not vary along the length of the body 42. Those skilled in the art who have the benefit of this description will realize how to design a specific embodiment to meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A spring comprising a curved C-shape body having a length between two ends of the C-shape, the body including a cavity that extends in a lengthwise direction along at least a majority of the length, the body having a cross-section across the length, the cross-section being different at a plurality of locations on the body along the length, the body having outer surfaces oriented transverse to the length and a plurality of webs between the outer surfaces, wherein the webs and the outer surfaces and the webs form two I-beams along the length joined side-by-side and the cavity is defined between the two I-beams.

2. The spring of claim 1, wherein the cavity extends along an entirety of the length.

3. The spring of claim 2, wherein the cavity has a different cross-sectional dimension at the plurality of locations.

4. The spring of claim 1, wherein
the spring exerts a spring force; and
a ratio of a moment of inertia of the spring to the spring force is essentially constant along the length.

5. The spring of claim 4, wherein
the body has a height in a direction transverse to the length; and
the height has a maximum near a center of the C-shape between the two ends.

6. The spring of claim 1, wherein the body comprises a high strength steel.

7. The spring of claim 6, wherein the body is formed by at least one of casting and three-dimensional printing.

8. The spring of claim 1, wherein the spring exerts a spring force toward an inside of the C-shape.

9. The spring of claim 1, wherein the cavity has a different cross-sectional dimension at the plurality of locations.

10. An elevator safety device comprising
a spring comprising a curved C-shape body having a length between two ends of the C-shape, the body including a cavity that extends in a lengthwise direction along at least a majority of the length, the body having a cross-section across the length, the cross-section being different at a plurality of locations on the body along the length, the body having outer surfaces oriented transverse to the length and a plurality of webs between the outer surfaces, wherein the webs and the outer surfaces and the webs form two I-beams along the length joined side-by-side and the cavity is defined between the two I-beams; and
at least one brake member that is configured to engage a surface in a hoistway for stopping an elevator car, wherein the spring urges the at least one brake member in a direction to engage the surface.

11. The elevator safety device of claim 10, wherein
an inside of the ends are situated to urge a respective brake member toward an inside of the C-shape.

12. The elevator safety device of claim 11, wherein
the safety device comprises a brake housing;
the respective brake members are supported on the brake housing for movement in a first direction between a disengaged position and a braking position; and
the spring urges the brake members in a second direction that is transverse to the first direction.

13. The elevator safety device of claim 12, wherein the body flexes outwardly responsive to the brake members moving into the braking position while urging the brake members toward the inside of the C-shape.

* * * * *